United States Patent
Strandborg et al.

(10) Patent No.: US 12,432,332 B1
(45) Date of Patent: Sep. 30, 2025

(54) AUTOSTEREOSCOPIC DISPLAY WITH IMPROVED LENTICULAR RESOLUTION

(71) Applicant: Distance Technologies Oy, Helsinki (FI)

(72) Inventors: Mikko Strandborg, Hangonkylä (FI); Thomas Carlsson, Vantaa (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/186,827

(22) Filed: Apr. 23, 2025

(51) Int. Cl.
*H04N 5/225* (2006.01)
*H04N 13/305* (2018.01)
*H04N 13/383* (2018.01)

(52) U.S. Cl.
CPC ......... *H04N 13/305* (2018.05); *H04N 13/383* (2018.05)

(58) Field of Classification Search
CPC ............................ H04N 13/305; H04N 13/383
See application file for complete search history.

(56) References Cited

U.S. PATENT DOCUMENTS

| | | | | |
|---|---|---|---|---|
| 5,712,732 | A * | 1/1998 | Street | H04N 13/373 348/E13.058 |
| 11,736,678 | B2 * | 8/2023 | Allio | H04N 13/305 348/59 |
| 2016/0219258 | A1 * | 7/2016 | Woodgate | H04N 23/661 |
| 2020/0021796 | A1 * | 1/2020 | Russell | H04N 13/383 |
| 2022/0400245 | A1 * | 12/2022 | Perreault | G02B 30/27 |
| 2024/0385436 | A1 * | 11/2024 | Dehkordi | G06F 3/012 |

* cited by examiner

*Primary Examiner* — Gims S Philippe
(74) *Attorney, Agent, or Firm* — ZIEGLER IP LAW GROUP, LLC.

(57) ABSTRACT

An autostereoscopic display includes a light-emitting panel and a lenticular array in which a focal length of a lenticular lens is different from its thickness. For an intersection of a given row of light-emitting cells and a given lenticular lens, a given viewing direction from a given eye toward said intersection is determined. From light-emitting cells arranged on the given row and on whose optical path the given lenticular lens lies, a set of light-emitting cells whose light travels toward the given eye is determined. Corresponding regions on a curved surface of the given lenticular lens through which light from individual light-emitting cells of the set pass toward the given eye are identified and mapped to respective pixel locations in an image to be presented. Pixel values of pixels located at these pixel locations in the image are retrieved and used to generate an output image for display.

17 Claims, 8 Drawing Sheets

AUTOSTEREOSCOPIC DISPLAY WITH IMPROVED LENTICULAR RESOLUTION

TECHNICAL FIELD

The present disclosure relates to autostereoscopic displays; and more particularly, to systems that incorporate autostereoscopic displays having improved lenticular resolution. The present disclosure also relates to methods for displaying via such systems.

BACKGROUND

Autostereoscopic displays employing lenticular arrays enable glasses-free three-dimensional (3D) viewing by directing light from different light-emitting cells toward different eyes of each user. In such an autostereoscopic display, a lenticular array arranged on an optical path of a light-emitting panel is configured such that a focal length of each lenticular lens matches a physical thickness of that lenticular lens along its optical axis. In such a configuration, each viewing direction receives light emitted by a unique, singular light-emitting cell of the light-emitting panel. From the perspective of a user, an entire width of each lenticular lens appears to emit light of the same colour and intensity, as the light is redirected from the same light-emitting cell.

However, this configuration imposes significant limitations on display resolution. Because each viewing direction receives light from only a narrow region of the light-emitting panel through an entire width of a lenticular lens, an effective horizontal resolution of a displayed image is limited to the number of lenticular lenses in the lenticular array. For example, if a width of each lenticular lens is 0.7 millimetres, a 27-inch display would provide an effective horizontal resolution of approximately 860 light-emitting cells, which is typically insufficient for high-definition imaging applications.

Moreover, achieving exact lenticular focus across a wide range of viewing directions is only possible if each lenticular lens behaves as an ideal, infinitely thin optical element. In practice, each lenticular lens has a non-zero thickness along its optical axis and typically has a spherical surface profile. As a result, when the autostereoscopic display is viewed from an oblique angle, a distance travelled by light rays within a lenticular lens becomes longer than when the autostereoscopic display is viewed along the optical axis. Therefore, it is not possible to construct a lenticular lens that remains in perfect focus across all viewing directions. Additionally, due to the spherical shape of the lenticular lenses, spherical aberration occurs, preventing all light rays emitted by a light-emitting cell from converging to a single viewpoint.

In light of the foregoing, there exists a need for an autostereoscopic display system that provides improved horizontal resolution and compensates for distortions caused by spherical aberration and oblique viewing.

SUMMARY

The present disclosure seeks to provide a system and method for displaying high-resolution, artefact-free autostereoscopic images with improved optical clarity across a wide range of viewing directions, while enabling the use of thinner optical components. The aim of the present disclosure is achieved by an autostereoscopic display system and method that utilize a lenticular array in which a focal length of a given lenticular lens differs from its physical thickness, combined with per-eye tracking and selective rendering techniques, as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 1A is a schematic illustration of a system that incorporates an autostereoscopic display having improved lenticular resolution, while

DETAILED DESCRIPTION OF EMBODIMENTS

Figure 1A:
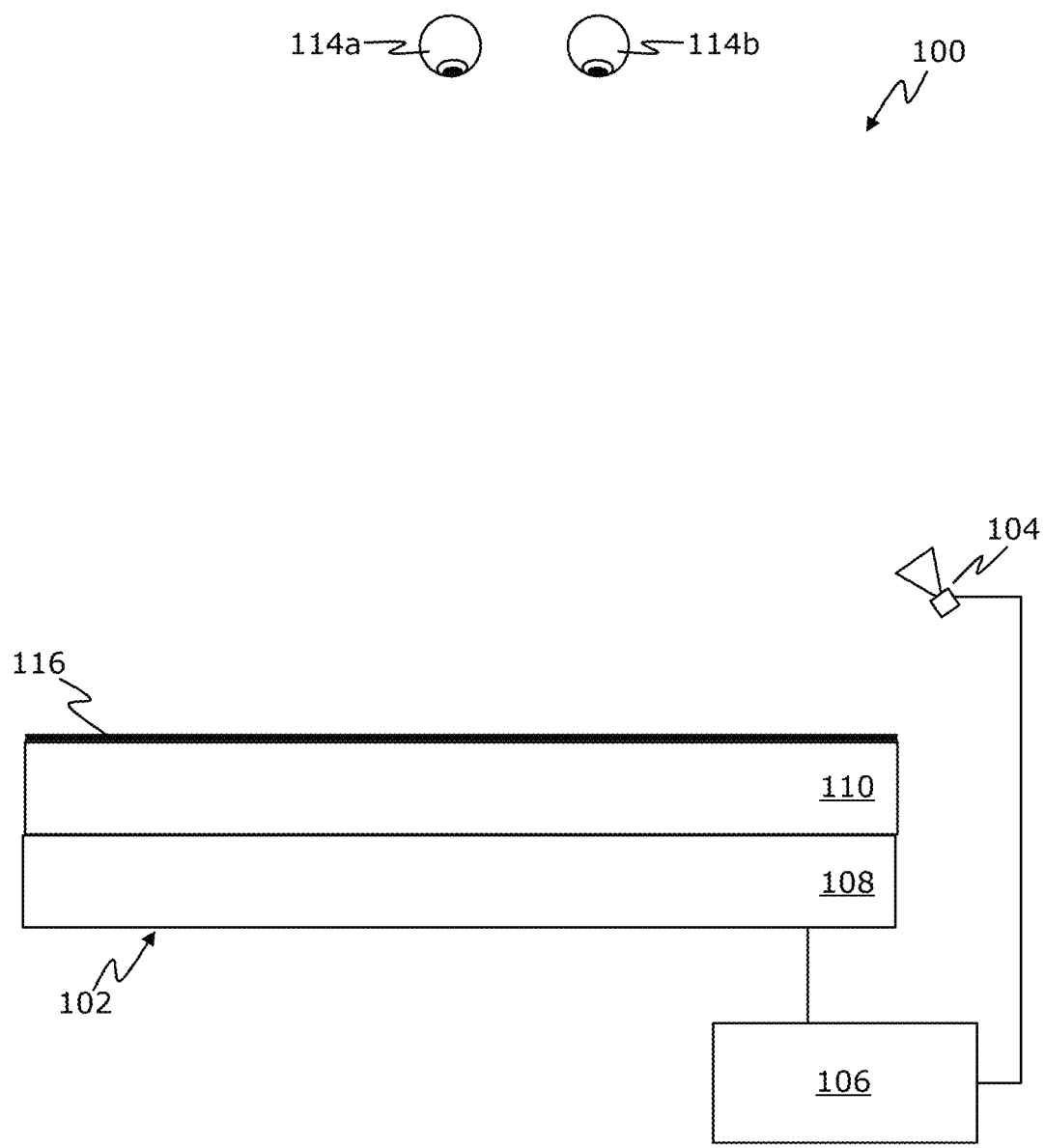

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  an eye tracker;
  an autostereoscopic display comprising:
    a light-emitting panel comprising a plurality of light-emitting cells; and
    a lenticular array arranged on an optical path of the light-emitting panel, the lenticular array comprising a plurality of lenticular lenses, wherein a focal length of a lenticular lens is different from a thickness of the lenticular lens along its optical axis; and
  at least one processor configured to:
    determine a relative position of each eye of at least one user with respect to an image plane of the autostereoscopic display, using the eye tracker;
    generate or retrieve a given image to be presented to a given eye of the at least one user, based on a relative position of the given eye with respect to the image plane;

for an intersection of a given row of light-emitting cells and a given lenticular lens, determine a given viewing direction from the given eye toward said intersection, based on the relative position of the given eye with respect to the image plane, a position of the given lenticular lens in the lenticular array, and a position of the given row in the light-emitting panel;

from a plurality of light-emitting cells that are arranged on the given row and on whose optical path the given lenticular lens lies, determine a given set of light-emitting cells whose light travels toward the given eye, based on the given viewing direction, a focal length of the given lenticular lens, and a thickness of the given lenticular lens along its optical axis;

identify corresponding regions on a curved surface of the given lenticular lens through which light from individual light-emitting cells of the given set pass toward the given eye;

map the corresponding regions on the curved surface of the given lenticular lens to respective pixel locations in the given image, based on locations of the corresponding regions on the curved surface of the given lenticular lens;

retrieve pixel values of pixels that are located at the respective pixel locations in the given image; and generate an output image for display by using the pixel values for the individual light-emitting cells of the given set.

In a second aspect, an embodiment of the present disclosure provides a method comprising:

determining a relative position of each eye of at least one user with respect to an image plane of an autostereoscopic display, using an eye tracker, wherein the autostereoscopic display comprises a light-emitting panel and a lenticular array arranged on an optical path of the light-emitting panel, the light-emitting panel comprising a plurality of light-emitting cells, the lenticular array comprising a plurality of lenticular lenses, wherein a focal length of a lenticular lens is different from a thickness of the lenticular lens along its optical axis;

generating or retrieving a given image to be presented to a given eye of the at least one user, based on a relative position of the given eye with respect to the image plane;

for an intersection of a given row of light-emitting cells and a given lenticular lens, determining a given viewing direction from the given eye toward said intersection, based on the relative position of the given eye with respect to the image plane, a position of the given lenticular lens in the lenticular array, and a position of the given row in the light-emitting panel;

from a plurality of light-emitting cells that are arranged on the given row and on whose optical path the given lenticular lens lies, determining a given set of light-emitting cells whose light travels toward the given eye, based on the given viewing direction, a focal length of the given lenticular lens, and a thickness of the given lenticular lens along its optical axis;

identifying corresponding regions on a curved surface of the given lenticular lens through which light from individual light-emitting cells of the given set pass toward the given eye;

mapping the corresponding regions on the curved surface of the given lenticular lens to respective pixel locations in the given image, based on locations of the corresponding regions on the curved surface of the given lenticular lens;

retrieving pixel values of pixels that are located at the respective pixel locations in the given image; and generating an output image for display by using the pixel values for the individual light-emitting cells of the given set.

The system and the method of the present disclosure improve an effective horizontal resolution of the autostereoscopic display by allowing multiple light-emitting cells per lenticular lens to contribute to the given image being presented to the given eye, rather than restricting each viewing direction to a single light-emitting cell per lenticular lens. This is achieved by configuring a lenticular lens such that its focal length differs from its physical thickness along its optical axis. Due to this difference, light emitted by a given light-emitting cell may exit different positions on the curved surface of the lenticular lens, depending on the given viewing direction. Those light-emitting cells that contribute light toward the given eye are determined, and the corresponding regions on the curved surface of the lenticular lens through which this light passes are identified. By mapping these corresponding regions to pixel locations in the given image and retrieving the corresponding pixel values, the output image is generated to make more efficient use of the available light-emitting cells.

This approach enables increased horizontal resolution by relaxing the conventional constraint that each viewing direction must be uniquely associated with a single light-emitting cell per lenticular lens. Instead, by determining the given viewing direction based on the relative position of the given eye with respect to the image plane and the geometry of the lenticular lens, those light-emitting cells (on whose optical path the lenticular lens lies) which contribute to the given viewing direction are selectively identified. This allows for finer directional control and improves visual clarity across a broader range of viewing angles.

Notably, in slightly defocused configurations, where the focal length of the lenticular lens is different from the thickness of the lenticular lens along its optical axis, the curved surface of the lenticular lens does not produce a conventional defocus blur. Instead, light from a given light-emitting cell may exit the curved surface of the lenticular lens from slightly different positions, depending on the viewing direction. As a result, a given viewing direction may receive light from more than one light-emitting cell, and conversely, a single light-emitting cell may contribute light to a small angular range of viewing directions. This optical behaviour relaxes the strict one-to-one mapping between light-emitting cells and viewing zones found in conventional focused lenticular systems and enables more flexible and robust selection of light-emitting cells for display to each eye.

Additionally, the use of lenticular lenses having a focal length different from their thickness allows for the design of thinner lenticular arrays without compromising optical performance. This supports more compact and lightweight autostereoscopic display systems, making the approach suitable for integration into portable, wearable, or space-constrained applications (for example, in heads-up display (HUD) systems).

By integrating the eye tracker with rendering logic that operates on a per-eye basis, the output image is dynamically adapted to the actual position of the given eye relative to the image plane. This enhances the alignment of displayed virtual content with the user's perspective, compensates for distortions due to spherical aberration and oblique viewing, and improves the fidelity and stability of the autostereoscopic image presentation.

Pursuant to embodiments of the present disclosure, the corresponding regions on the curved surface of the given lenticular lens through which the light from the individual light-emitting cells of the given set pass toward the given eye can be identified, based on the focal length and a refractive index of the given lenticular lens. It will be appreciated that, due to the given viewing direction and optical aberrations (such as spherical aberration) introduced by the curved surface of the given lenticular lens, the light emitted from the individual light-emitting cells of the given set may not be uniformly distributed across the curved surface. Accordingly, this non-uniform distribution may be taken into account when identifying the corresponding regions on the curved surface, to ensure accurate rendering toward the given eye.

In some implementations, the corresponding region on the curved surface of the given lenticular lens may be approximated based on the given viewing direction, the focal length of the given lenticular lens, and an effective thickness of the lenticular lens along the given viewing direction. In such implementations, a distribution of light rays from the individual light-emitting cells of the given set across the approximated region may be estimated. This distribution may be modelled, for example, as a linear function or, in more refined cases, using a polynomial function of the distance from a nominal focal point. These approximations may be used in systems where per-light-emitting-cell ray tracing is not performed, to estimate pixel locations for retrieving pixel values from the given image.

In this regard, the corresponding regions on the curved surface of the given lenticular lens can be mapped to the respective pixel locations in the given image, based further on the position of the given lenticular lens within the lenticular array and the position of the given row within the light-emitting panel. For a given light-emitting cell, a position of a corresponding region on the curved surface of the given lenticular lens can be used to calculate a direction vector from the given light-emitting cell toward the given eye. This direction vector can then be used to determine a corresponding location in the image plane, which, in turn, can be used to identify a corresponding pixel location in the given image. This process ensures that the perceived light direction and intensity at the given eye matches the intended appearance of the virtual content, while compensating for curvature of the lenticular lens and variations in viewing geometry.

It will be appreciated that the aforementioned steps have been described with reference to the given lenticular lens and the given row of pixels. These steps can be repeated for other lenticular lenses and other rows of pixels, namely, for each intersection between the lenticular lenses and the rows of pixels. As used throughout the present disclosure, a "row" refers to a linear arrangement of light-emitting cells that is perpendicular to a longitudinal axis of a lenticular lens. For a given row, each lenticular lens lies on an optical path of a plurality of light-emitting cells that are arranged along the given row. As an example, depending on system configuration and design resolution, each lenticular lens may lie on an optical path of four to eighteen light-emitting cells along a given row.

Notably, the output image can be adapted in a similar manner based on the actual position of each eye of the at least one user relative to the image plane. This also applies to implementations where the at least one user comprises a plurality of users. Optionally, in this regard, the at least one processor is configured to:

generate or retrieve another image to be presented to another eye of the at least one user, based on a relative position of the another eye with respect to the image plane;

for the intersection of the given row and the given lenticular lens, determine another viewing direction from the another eye toward the intersection, based on the relative position of the another eye with respect to the image plane, the position of the given lenticular lens in the lenticular array, and the position of the given row in the light-emitting panel;

from the plurality of light-emitting cells that are arranged on the given row and on whose optical path the given lenticular lens lies, determine another set of light-emitting cells whose light travels toward the another eye, based on the another viewing direction, the focal length of the given lenticular lens, and the thickness of the given lenticular lens;

identify other corresponding regions on the curved surface of the given lenticular lens through which light from individual light-emitting cells of the another set pass toward the another eye;

map the other corresponding regions on the curved surface of the given lenticular lens to other respective pixel locations in the another image, based on locations of the other corresponding regions on the curved surface of the given lenticular lens;

retrieve other pixel values of pixels that are located at the other respective pixel locations in the another image; and when generating the output image, use the other pixel values for the individual light-emitting cells of the another set.

This ability to independently generate a respective part of the output image for each eye further improves stereoscopic separation and reduces undesired crosstalk between views. Because separate viewing directions, contributing light-emitting cells, and corresponding regions on the curved surface for each eye of the at least one user are determined, the output image can be generated such that selected light-emitting cells are primarily visible to only one of the eyes. This improves image clarity, enhances depth perception, and reduces artefacts commonly associated with overlapping view zones.

To enable such selective visibility, a width of a given region on the curved surface of the given lenticular lens through which light from each light-emitting cell of the given set passes toward the given eye is determined. A width of another region on the curved surface of the given lenticular lens through which light from the same light-emitting cell passes toward the another eye is also determined. Based on the width of the given region and the width of the another region, a level of visibility of that light-emitting cell to one eye relative to the other eye can be evaluated. Notably, these widths are measured along a width of the given lenticular lens. Threshold-based selection criteria may then be applied, such that a light-emitting cell is used to display virtual content only when it is sufficiently visible to an intended eye and minimally visible to the other eye.

Optionally, in this regard, when identifying the corresponding regions on the curved surface of the given lenticular lens, the at least one processor is configured to:

determine respective widths of the corresponding regions along the width of the given lenticular lens;

for a given light-emitting cell of the given set, detect when a width of a first region on the curved surface through which light from the given light-emitting cell passes toward the given eye exceeds a first predefined threshold, and when a width of a second region on the curved surface through which light from the given light-emitting cell passes toward the another eye of the at least one user is below a second predefined threshold; and when it is detected that the width of the first region exceeds the first predefined threshold, and the width of the second region is below the second predefined threshold, select the given light-emitting cell for retrieving a pixel value for display to the given eye.

In this regard, the first predefined threshold may lie in a range of 10 percent to 40 percent of the width of the lenticular lens. The second predefined threshold may lie in a range of 5 percent to 15 percent of the width of the lenticular lens. As an example, for a lenticular lens having a width of 0.5 millimetres, the first predefined threshold may be set to 100 micrometres, and the second predefined threshold may be set to 50 micrometres. It will be appreciated that the first predefined threshold and the second predefined threshold may be defined based on the number of light-emitting cells on whose optical path the lenticular lens lies. In some implementations, the second predefined threshold may be set to be equal to the first predefined threshold.

Such a manner of selecting light-emitting cells for retrieving pixel values enables display of virtual content with high directional precision, while maintaining strict interocular separation. By using the first predefined threshold for the width of the region through which a light-emitting cell contributes to the given eye, such selecting ensures that only those light-emitting cells that are meaningfully visible to the given eye and effectively hidden from the another eye are used in rendering. This significantly reduces view leakage and ghosting artefacts between the eyes of the at least one user, which are common in conventional autostereoscopic systems relying on fixed lenticular alignment. As a result, stereoscopic depth cues are more distinct, and the overall 3D visual experience is cleaner and more comfortable for the user, even in dynamic or multi-user scenarios. Moreover, this decision logic allows more efficient use of available rendering resources, as light-emitting cells that would otherwise cause crosstalk can be omitted from rendering for the intended eye without compromising image quality for the other eye. This approach improves stereoscopic separation and reduces crosstalk, while accounting for real-time user position and lenticular geometry.

Otherwise, when it is detected that the width of the first region does not exceed the first predefined threshold, and/or the width of the second region is not below the second predefined threshold, the given light-emitting cell may be excluded from use in retrieving a pixel value for display to the given eye. In such a case, the given light-emitting cell may not be selected for rendering to either eye, in order to prevent crosstalk or visual artefacts. This fallback strategy enables dynamic suppression or redistribution of ambiguous contributions, thereby preserving visual quality, minimizing ghosting, and ensuring that each light-emitting cell is used only when its directional contribution can be reliably resolved.

Alternatively, when it is detected that the width of the first region does not exceed the first predefined threshold, and/or the width of the second region is not below the second predefined threshold, the given light-emitting cell may be selected for retrieving a pixel value for display to a dominant eye of the at least one user. This dominant-eye-based selection may be used when both eyes have similar visibility to the given light-emitting cell, or when the visibility criteria are not strictly satisfied but perceptual prioritization favours maintaining image stability for the dominant eye.

Additionally, optionally, the at least one processor is configured to:

determine a shape and a density of a probability cloud for each eye of the at least one user, wherein a given probability cloud represents a probability distribution of the given eye being at a position within the given probability cloud, and another probability cloud represents a probability distribution of the another eye being at a position within the another probability cloud; and adjust at least one of: the first predefined threshold, the second predefined threshold, based on the shape and the density of the probability cloud for each eye.

To account for uncertainty in the determined relative position of each eye, a probability distribution of possible positions may be maintained for each eye of the at least one user. Such a distribution may be represented as a probability cloud, indicating a range of likely positions in which the given eye or the another eye may be located relative to the image plane. The shape and the density of the probability cloud for each eye may be determined, for example, based on at least one of: noise characteristics of the eye tracker, past tracked positions of the eyes, temporal filtering. Based on the determined probability cloud for each eye, at least one of: the first predefined threshold, the second predefined threshold may be adjusted to improve robustness of selection of the light-emitting cells.

As an example, when both the given probability cloud (for the given eye's position) and the another probability cloud (for the another eye's position) are wider or expand, it means that the probability of the given eye and the probability of the another eye being at their respective positions has decreased. In such a case, the first predefined threshold is increased. Additionally, the second predefined threshold could be decreased.

As another example, when the given probability cloud (for the given eye's position) shrinks, while the another probability cloud (for the another eye's position) expands, both the first predefined threshold and the second predefined threshold could be decreased.

This adaptive adjustment of at least one of: the first predefined threshold, the second predefined threshold, based on per-eye probability clouds, increases the reliability of stereoscopic separation under real-world conditions where eye tracking may be imprecise or unstable. By tailoring selection criteria to match the estimated tracking accuracy for each eye, this approach reduces the likelihood of crosstalk even when user movement or environmental factors introduce tracking noise. It also improves rendering efficiency by avoiding overly conservative thresholds when eye position is well known. As a result, this approach provides a more stable and comfortable 3D viewing experience, particularly in dynamic scenarios or in applications involving head motion or multi-user viewing, where tracking fidelity may vary.

Moreover, optionally, the at least one processor is configured to:
  determine a gaze direction of each eye of the at least one user, using the eye tracker; and
  when determining the given set of light-emitting cells:
    for a given light-emitting cell of the given set, detect when a first viewing direction from the given eye toward the given light-emitting cell is within a predefined angle from a gaze direction of the given eye, and when a second viewing direction from another eye of the at least one user toward the given light-emitting cell is not within the predefined angle from a gaze direction of the another eye;
    when it is detected that the first viewing direction is within the predefined angle from the gaze direction of the given eye, and the second viewing direction is not within the predefined angle from the gaze direction of the another eye, select the given light-emitting cell for retrieving a pixel value for display to the given eye.

The gaze direction of the given eye and the gaze direction of the another eye may be used to further refine the selection of the light-emitting cells. In this regard, the predefined angle may lie in a range of 3 degrees to 15 degrees; more optionally, in a range of 5 degrees to 10 degrees.

For the given light-emitting cell of the given set, the first viewing direction from the given eye toward the given light-emitting cell and the second viewing direction from the another eye toward the same light-emitting cell are determined. The first viewing direction is then compared to the gaze direction of the given eye, and the second viewing direction is compared to the gaze direction of the another eye. When the first viewing direction is within the predefined angle from the gaze direction of the given eye, and the second viewing direction is not within the predefined angle from the gaze direction of the another eye, the given light-emitting cell is considered suitable to select for retrieving the pixel value for display to the given eye. This approach allows for gaze-driven prioritization of light-emitting cells that are more likely to be perceived with higher visual sensitivity by the given eye of the user as compared to the another eye of the user.

Incorporating gaze direction into the selection of light-emitting cells enhances the perceptual fidelity of the displayed virtual content by aligning rendering decisions with where the user is actually looking. Since the human visual system is most sensitive near the gaze direction, selecting light-emitting cells that lie along the gaze direction of the given eye (for retrieving the pixel value for display to the given eye) improves sharpness and clarity in regions of visual focus. At the same time, by detecting that these light-emitting cells are not meaningfully visible to the another eye, interocular separation is maintained while suppressing crosstalk. This results in more efficient rendering, as pixel values are selected for display only where they are perceptually relevant. The gaze-aware selection further improves depth perception and reduces visual fatigue, particularly in interactive or dynamic environments where users shift their gaze frequently.

Otherwise, when it is detected that the first viewing direction is not within the predefined angle from the gaze direction of the given eye, and/or the second viewing direction is within the predefined angle from the gaze direction of the another eye, the given light-emitting cell may be selected for retrieving a pixel value for display to the another eye. This ensures that light-emitting cells are only used when they are directionally aligned with the gaze direction of one eye and sufficiently misaligned from the gaze direction of the other eye, thereby preserving stereoscopic separation and enhancing perceptual focus. This approach allows for adaptive re-allocation of light-emitting cells based on real-time gaze behaviour, ensuring that each light-emitting cell contributes to the most perceptually relevant region of the displayed virtual content.

Additionally, optionally, when determining the given set of light-emitting cells, the at least one processor is configured to:
  determine whether the given eye or the another eye is a dominant eye of the at least one user; and
  when it is detected that the first viewing direction is within the predefined angle from the gaze direction of the given eye, and the second viewing direction is within the predefined angle from the gaze direction of the another eye, select the given light-emitting cell for retrieving a pixel value for display to the dominant eye.

The dominant eye can be determined using any suitable well-known technique. In some implementations, the dominant eye is determined using the eye tracker. In other implementations, the dominant eye is determined using a calibration procedure. In yet other implementations, the dominant eye is determined by an optometrist, and information indicative of the dominant eye of the at least one user is pre-stored at a data repository, from where this information can be accessed.

When both the first viewing direction (from the given eye toward the given light-emitting cell) and the second viewing direction (from the another eye toward the same light-emitting cell) are within the predefined angle from gaze directions of respective eyes, the given light-emitting cell can be selected for retrieving the pixel value for display to the dominant eye. This enables content rendering to be biased in favour of the dominant eye when both eyes would otherwise qualify for the same light-emitting cell, based on their gaze directions.

Such dominant eye based selection provides a reliable fallback when both the given eye and the another eye satisfy gaze-based visibility criteria for the same light-emitting cell. By prioritizing the dominant eye in such cases, it is ensured that the displayed virtual content is routed to the eye with greater perceptual influence (namely, the dominant eye), thereby improving image stability and perceived sharpness. This strategy also prevents conflicting rendering decisions when both eyes are closely aligned in gaze direction, but must not receive the light from the same light-emitting cell. As a result, this approach reduces the likelihood of double imaging or interocular ambiguity, enhances viewing comfort, and maintains consistent stereoscopic cues in situations where gaze directions of both eyes satisfy the gaze-based visibility criteria.

Furthermore, optionally, the lenticular array further comprises an active optical layer arranged between the light-emitting panel and the plurality of lenticular lenses. As mentioned earlier, the corresponding regions on the curved surface of the given lenticular lens through which the light from the individual light-emitting cells of the given set pass toward the given eye may be identified, based on a focal length and a refractive index of the given lenticular lens. Optionally, in this regard, the at least one processor is configured to control a corresponding portion of the active optical layer to modify the focal length of the given lenticular lens, to increase widths of the corresponding regions on the curved surface through which the light from the individual light-emitting cells of the given set pass toward the given eye.

Hereinabove, the term "corresponding portion of the active optical layer" refers to a portion of the active optical layer that corresponds to said intersection of the given row and the given lenticular lens. In some implementations, the modification of the focal length can be performed in real time based on the relative position of the given eye with respect to the image plane. Such focal length modification may be achieved using well-known tunable optical mechanisms. As an example, the active optical layer may be implemented using any one of: a liquid crystal layer, a deformable polymer layer, or another material having an electrically-reconfigurable refractive index profile. In some implementations, different portions of the active optical layer may be controlled independently to modify focal lengths of individual lenticular lenses or groups of lenticular lens, based on gaze-contingent selection criteria and rendering requirements, as described later.

Employing the active optical layer to modify the focal length of the given lenticular lens allows to dynamically adapt an optical path of the light between the light-emitting panel and the given eye. This allows the widths of the corresponding regions on the curved surface of the lenticular lens to be increased for the given eye, which can improve visibility and directional control of the light from the selected light-emitting cells. Increasing the width of the corresponding regions makes it more likely that a given light-emitting cell satisfies the predefined threshold conditions for visibility, thereby increasing the number of usable light-emitting cells for the given eye, while maintaining separation from the another eye.

Wider regions allow for more flexible rendering choices, especially in cases where eye tracking introduces uncertainty or where optical alignment varies with user movement. Dynamically modifying the focal length also enables compensation for optical distortion, environmental variation (such as temperature-induced refractive index shifts), or manufacturing tolerances. As a result, the integration of the active optical layer into the lenticular array improves image stability, supports thinner optical stacks, and allows for adaptive optimization of the multiscopic rendering pipeline in response to real-time viewing conditions.

Additionally, optionally, the at least one processor is configured to:
  determine the gaze direction of each eye of the at least one user, using the eye tracker; and
  when identifying the corresponding regions on the curved surface of the given lenticular lens:
    for a given light-emitting cell of the given set, detect when a first viewing direction from the given eye toward the given light-emitting cell is within the predefined angle from the gaze direction of the given eye, and when a second viewing direction from another eye of the at least one user toward the given light-emitting cell is not within the predefined angle from the gaze direction of the another eye; and
    when it is detected that the first viewing direction is within the predefined angle from the gaze direction of the given eye, and the second viewing direction is not within the predefined angle from the gaze direction of the another eye, control the corresponding portion of the active optical layer to modify the focal length of the given lenticular lens, to selectively increase a width of a corresponding region on the curved surface through which light from the given light-emitting cell passes toward the given eye.

Incorporating gaze-based control of the corresponding portion of the active optical layer to modify the focal length of the given lenticular lens allows to further prioritize light-emitting cells that are aligned with the user's actual visual focus. Dynamically increasing the width of the corresponding region through which the light from the given light-emitting cell passes toward the given eye, when the given light-emitting cell is both aligned with the gaze direction of the given eye and misaligned with the gaze direction of the another eye, enables more confident and perceptually relevant rendering decisions. This improves brightness and stability for content near the user's point of attention, while maintaining interocular separation and suppressing crosstalk. Additionally, controlling the active optical layer in a gaze-contingent manner reduces unnecessary focal length changes, improves power efficiency, and enhances spatial precision of adaptive optics across the display. As a result, the displayed virtual content becomes sharper, more immersive, and more robust under natural gaze behaviour and head movement.

More additionally, optionally, when identifying the corresponding regions on the curved surface of the given lenticular lens, the at least one processor is configured to:
  determine whether the given eye or the another eye is the dominant eye of the at least one user; and
  when it is detected that the first viewing direction is within the predefined angle from the gaze direction of the given eye, and the second viewing direction is within the predefined angle from the gaze direction of the another eye, control the corresponding portion of the active optical layer to modify the focal length of the given lenticular lens, to selectively increase a width of a corresponding region on the curved surface through which the light from the given light-emitting cell passes toward the dominant eye.

By modifying the focal length of the given lenticular lens based on eye dominance in cases where both the given eye and the another eye meet gaze-based visibility criteria, this approach ensures that visual content is prioritized for the eye with stronger perceptual influence (namely, the dominant eye). Increasing the width of the corresponding region toward the dominant eye enhances the stability, depth accuracy, and visual consistency of the displayed virtual content in ambiguous or overlapping gaze scenarios. This helps to avoid potential visual conflicts that may arise when both eyes are aligned with the same light-emitting cell. Gaze-contingent focal length modification driven by eye dominance also improves perceptual targeting without compromising interocular separation, which contributes to a more comfortable and immersive 3D experience. Furthermore, the use of dominance-based selection supports robust rendering decisions in multi-user or variable lighting conditions, where momentary symmetry in gaze direction might otherwise cause artefacts or instability.

In multi-user scenarios, priority rules may be applied to determine which user's eye receives rendering preference when visibility conflicts arise. In this regard, such priority rules may be defined based on individual roles of the users. As an example, a user whose role is designated as having higher priority than that of one or more other users may be given rendering preference. Additionally or alternatively, such priority rules may be defined based on the gaze stability of the respective dominant eyes of the users, such that the user with a more stable gaze is given priority in cases of conflict.

Pursuant to embodiments of the present disclosure, the focal length of the lenticular lens does not differ drastically from the thickness of the lenticular lens along its optical axis. Optionally, in this regard, the thickness of the lenticular lens is within a predefined threshold relative to the focal length of the lenticular lens. When the thickness of the lenticular lens (measured along the optical axis) lies within the predefined threshold, an effective thickness of the lenticular lens along any viewing direction would lie within another predefined threshold that is only slightly larger than the predefined threshold. Throughout the present disclosure, the term "effective thickness" refers to a thickness of the lenticular lens measured along a given viewing direction. Notably, the effective thickness increases upon shifting from a straight viewing direction (along the optical axis) towards a more oblique viewing direction. The predefined threshold can be expressed as a predefined percentage of the thickness or the focal length. This predefined percentage could lie within a range of 2% to 15%, and more optionally, within a range of 5% to 10%. The predefined threshold can alternatively be expressed as a predefined ratio with respect to the thickness of the focal length.

Maintaining the thickness of the lenticular lens within the predefined threshold relative to its focal length allows for predictable light redirection characteristics, enabling precise identification of regions on the curved surface through which light from each light-emitting cell passes toward a given eye. This relationship ensures that the lenticular lens remains slightly out of focus in a controlled manner, supporting the rendering strategies described earlier, while avoiding excessive optical aberration or distortion. Additionally, such a configuration n simplifies lens manufacturing tolerances, while preserving the directional selectivity required for multiscopic imaging.

In some implementations, the focal length of the lenticular lens is greater than the thickness of the lenticular lens.

In such implementations, if the thickness of the lenticular lens is within the predefined threshold relative to the focal length of the lenticular lens, it is possible that the effective thickness of the lenticular lens along a viewing direction becomes greater than the focal length when the viewing direction is oblique relative to the optical axis of the lenticular lens. In other words, as the viewing direction from the given eye toward the given set of light-emitting cells (and the given lenticular lens) becomes increasingly oblique relative to the optical axis of the given lenticular lens, the effective thickness of the given lenticular lens continues to increase and possibly exceeds the focal length. As a result, a usable area of the light-emitting cells from the perspective of the given eye initially shrinks and then expands. This allows the effective horizontal resolution to be maintained across a wider range of viewing directions, thereby supporting a broader display viewing area.

It will be appreciated that if the effective thickness of the lenticular lens along a given viewing direction is greater than the focal length of the lenticular lens in that viewing direction, a spatial relationship between the light-emitting cells and the corresponding regions of the curved surface of the lenticular lens exhibits an inversion effect. In such a case, a light-emitting cell located on one side of the lenticular lens may contribute light to a region on an opposite side of the curved surface of the lenticular lens, as observed from the given eye. For example, light from a light-emitting cell located near a left edge of the lenticular lens may pass through a region near a right edge of the curved surface of the lenticular lens, and vice versa. As the corresponding regions on the curved surface of the given lenticular lens are identified based on the focal length and the refractive index of the given lenticular lens, an outgoing light path for each light-emitting cell is determined individually. This inherently takes this inversion effect into account.

In contrast, in implementations that approximate the corresponding regions on the curved surface of the lenticular lens without determining individual outgoing light paths for each light-emitting cell, such as those using geometric spread or region-width heuristics, the inversion effect may need to be explicitly detected and corrected. In such cases, when it is detected that the effective thickness of the lenticular lens along a given viewing direction exceeds the focal length of the lenticular lens, the spatial mapping between the light-emitting cell and the corresponding region on the curved surface of the lenticular lens is inverted, and the location of the corresponding region is mirrored along a width of the lenticular lens to preserve directional accuracy. Failure to apply such correction could result in incorrect mapping of the corresponding region to the pixel locations in the given image, leading to image flipping artefacts or incorrect directional output. Accordingly, accounting for the inversion effect, either through per-ray tracing or explicit geometric correction, ensures accurate rendering and stable view alignment across the full range of viewing directions.

For illustration purposes, there will now be described how various components of the system can be implemented. The at least one processor of the system controls an overall operation of the system, and is communicably coupled to the eye tracker and the autostereoscopic display. Optionally, the at least one processor is implemented as a processor of the autostereoscopic display. Alternatively, optionally, the at least one processor of the system is implemented as a processor of a computing device that is communicably coupled to the autostereoscopic display. Examples of the computing device include, but are not limited to, a laptop, a desktop, a tablet, a phablet, a personal digital assistant, a workstation, and a console. Yet alternatively, optionally, the at least one processor of the system is implemented as a cloud server (namely, a remote server) that provides a cloud computing service.

Throughout the present disclosure, the term "eye tracker" refers to specialised equipment for detecting and/or following a position of eyes of a given user. The given user encompasses each individual one of the at least one user; notably, the at least one user can be a single user or a plurality of users. Optionally, the eye tracker is implemented as at least one tracking camera. The at least one tracking camera may comprise at least one of: at least one visible-light camera, at least one infrared (IR) camera, at least one depth camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, and the at least one depth camera) may be utilised in the eye tracker. When different types of images captured by the various different types of tracking cameras are utilised, a position of the user's eyes can be determined highly accurately, as results obtained from one type of image can be used to refine results obtained from another type of image. Herein, these different types of images constitute tracking data collected by the eye tracker, and may be in the form of at least one of: visible-light images, IR images, depth images. It will be appreciated that the eye tracker tracks the eyes of the given user with a significantly high accuracy and precision, such that an error in determining the relative position may, for example, be minimised to within a tolerance range of approximately (+/−) 8 millimetres.

The given image and the another image to be presented to the given eye and the another eye of the at least one user are generated or retrieved based on the relative positions of the given eye and the another eye with respect to the image plane, respectively. In some implementations, the at least one processor is configured to generate the given image and the another image by employing a 3D model of at least one virtual object. Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at the data repository that is communicably coupled to the at least one processor. The data repository may be implemented as a memory of the at least one processor, a cloud-based database, or similar. In other implementations, the at least one processor is configured to retrieve the given image and the another image in a form of 2D user interface (UI) elements. A 2D UI element could pertain to, for example, a virtual navigation tool, a virtual gadget, a virtual message, a virtual entity, a virtual entertainment media, a virtual information, or similar.

Notably, the same output image is displayed for different eyes of the at least one user. This output image is conceptually similar to a conventional light field image, with the distinction that a greater number of light-emitting cells are employed per lenticular lens to present high-resolution virtual content to the different eyes of the at least one user. Light field images, which represent view-dependent image information across multiple angular directions, are well known in the art.

In some implementations, the light-emitting panel can be implemented as a liquid crystal display (LCD) device. In a first sub-implementation, the LCD device comprises a colour filter array to enable display of a full-colour image. In a second sub-implementation, the LCD device comprises a colour-sequential backlight unit, which includes a colour wheel or a time-multiplexed arrangement of light sources to provide sequential illumination in different primary colors (for example, red, green, and blue). In such a case, liquid crystal cells of a liquid crystal layer in the LCD device do not require fixed sub-pixel colour filters, but instead modulate light dynamically in synchronization with the backlight colour cycle. In other implementations, the plurality of light-emitting cells can be implemented as any one of: light-emitting diodes (LEDs), mini-LEDs, micro-LEDs, organic LEDs (OLEDs). It will be appreciated that irrespective of the implementation, the autostereoscopic display can be a monochrome display.

Throughout the present disclosure, the term "image plane" refers to an imaginary or virtual plane on which an image is perceived to be displayed. In some implementations, the image plane of the autostereoscopic display is an outermost surface of the autostereoscopic display from which the light emits or a plane of the lenticular array. This is particularly a case when no optical combiner is used in the system. In other implementations, the system further comprises an optical combiner arranged on an optical path of the autostereoscopic display and an optical path of a real-world light field of a real-world environment. In such implementations, the image plane is an imaginary image plane. Irrespective of the implementation, the image plane refers to an intended location in space where the virtual content is perceived, and does not require the autostereoscopic display or other optical elements on the optical path to be physically planar.

In the other implementations where the system comprises the optical combiner, the system is susceptible to be implemented as an augmented reality (AR) system. As an example, the system can be implemented as a heads-up display (HUD) system.

The present disclosure also relates to the method as described above. Various embodiments and variants disclosed above, with respect to the aforementioned first aspect, apply mutatis mutandis to the method.

Optionally, the method further comprises:
generating or retrieving another image to be presented to another eye of the at least one user, based on a relative position of the another eye with respect to the image plane;
for the intersection of the given row and the given lenticular lens, determining another viewing direction from the another eye toward the intersection, based on the relative position of the another eye with respect to the image plane, the position of the given lenticular lens in the lenticular array, and the position of the given row in the light-emitting panel;
from the plurality of light-emitting cells that are arranged on the given row and on whose optical path the given lenticular lens lies, determining another set of light-emitting cells whose light travels toward the another eye, based on the another viewing direction, the focal length of the given lenticular lens, and the thickness of the given lenticular lens;
identifying other corresponding regions on the curved surface of the given lenticular lens through which light from individual light-emitting cells of the another set pass toward the another eye;
mapping the other corresponding regions on the curved surface of the given lenticular lens to other respective pixel locations in the another image, based on locations of the other corresponding regions on the curved surface of the given lenticular lens;
retrieving other pixel values of pixels that are located at the other respective pixel locations in the another image; and
when generating the output image, using the other pixel values for the individual light-emitting cells of the another set.

Because separate viewing directions, contributing light-emitting cells, and corresponding regions on the curved surface for each eye of the at least one user are determined, the output image can be generated such that selected light-emitting cells are primarily visible to only one of the eyes. This improves image clarity, enhances depth perception, and reduces artefacts commonly associated with overlapping view zones.

Moreover, optionally, the step of identifying the corresponding regions on the curved surface of the given lenticular lens comprises:
  determining respective widths of the corresponding regions along a width of the given lenticular lens;
  for a given light-emitting cell of the given set, detecting when a width of a first region on the curved surface through which light from the given light-emitting cell passes toward the given eye exceeds a first predefined threshold, and when a width of a second region on the curved surface through which light from the given light-emitting cell passes toward another eye of the at least one user is below a second predefined threshold; and
  when it is detected that the width of the first region exceeds the first predefined threshold, and the width of the second region is below the second predefined threshold, selecting the given light-emitting cell for retrieving a pixel value for display to the given eye.

Such a manner of selecting light-emitting cells for retrieving pixel values enables display of virtual content with high directional precision, while maintaining strict interocular separation. This also ensures that only those light-emitting cells that are meaningfully visible to the given eye and effectively hidden from the another eye are used in rendering. This approach improves stereoscopic separation and reduces crosstalk, while accounting for real-time user position and lenticular geometry.

Additionally, optionally, the method further comprises:
  determining a shape and a density of a probability cloud for each eye of the at least one user, wherein a given probability cloud represents a probability distribution of the given eye being at a position within the given probability cloud, and another probability cloud represents a probability distribution of the another eye being at a position within the another probability cloud; and
  adjusting at least one of: the first predefined threshold, the second predefined threshold, based on the shape and the density of the probability cloud for each eye.

This adaptive adjustment of at least one of: the first predefined threshold, the second predefined threshold, based on per-eye probability clouds, increases the reliability of stereoscopic separation under real-world conditions where eye tracking may be imprecise or unstable. By tailoring selection criteria to match the estimated tracking accuracy for each eye, this approach reduces the likelihood of crosstalk even when user movement or environmental factors introduce tracking noise.

Moreover, optionally, the method further comprises:
  determining a gaze direction of each eye of the at least one user, using the eye tracker; and
  when determining the given set of light-emitting cells:
    for a given light-emitting cell of the given set, detecting when a first viewing direction from the given eye toward the given light-emitting cell is within a predefined angle from a gaze direction of the given eye, and when a second viewing direction from another eye of the at least one user toward the given light-emitting cell is not within the predefined angle from a gaze direction of the another eye;
    when it is detected that the first viewing direction is within the predefined angle from the gaze direction of the given eye, and the second viewing direction is not within the predefined angle from the gaze direction of the another eye, selecting the given light-emitting cell for retrieving a pixel value for display to the given eye.

Incorporating gaze direction into the selection of light-emitting cells enhances the perceptual fidelity of the displayed virtual content by aligning rendering decisions with where the user is actually looking. Since the human visual system is most sensitive near the gaze direction, selecting light-emitting cells that lie along the gaze direction of the given eye (for retrieving the pixel value for display to the given eye) improves sharpness and clarity in regions of visual focus. The gaze-aware selection further improves depth perception and reduces visual fatigue, particularly in interactive or dynamic environments where users shift their gaze frequently.

Additionally, optionally, the step of determining the given set of light-emitting cells comprises:
  determining whether the given eye or the another eye is a dominant eye of the at least one user; and
  when it is detected that the first viewing direction is within the predefined angle from the gaze direction of the given eye, and the second viewing direction is within the predefined angle from the gaze direction of the another eye, selecting the given light-emitting cell for retrieving a pixel value for display to the dominant eye.

Such dominant eye based selection provides a reliable fallback when both the given eye and the another eye satisfy gaze-based visibility criteria for the same light-emitting cell. By prioritizing the dominant eye in such cases, it is ensured that the displayed virtual content is routed to the eye with greater perceptual influence (namely, the dominant eye), thereby improving image stability and perceived sharpness. This strategy also prevents conflicting rendering decisions when both eyes are closely aligned in gaze direction, but must not receive the light from the same light-emitting cell. As a result, this approach reduces the likelihood of double imaging or interocular ambiguity, enhances viewing comfort, and maintains consistent stereoscopic cues in situations where gaze directions of both eyes satisfy the gaze-based visibility criteria.

Optionally, the lenticular array further comprises an active optical layer arranged between the light-emitting panel and the plurality of lenticular lenses. The corresponding regions on the curved surface of the given lenticular lens through which the light from the individual light-emitting cells of the given set pass toward the given eye may be identified, based on a focal length and a refractive index of the given lenticular lens. Optionally, in this regard, the method further comprises controlling a corresponding portion of the active optical layer to modify the focal length of the given lenticular lens, to increase widths of the corresponding regions on the curved surface through which the light from the individual light-emitting cells of the given set pass toward the given eye.

Employing the active optical layer to modify the focal length of the given lenticular lens allows to dynamically adapt an optical path of the light between the light-emitting panel and the given eye. This allows the widths of the corresponding regions on the curved surface of the lenticular lens to be increased for the given eye, which can improve visibility and directional control of the light from the selected light-emitting cells.

Additionally, optionally, the method further comprises:
  determining a gaze direction of each eye of the at least one user, using the eye tracker; and when identifying the corresponding regions on the curved surface of the given lenticular lens:

for a given light-emitting cell of the given set, detecting when a first viewing direction from the given eye toward the given light-emitting cell is within a predefined angle from a gaze direction of the given eye, and when a second viewing direction from another eye of the at least one user toward the given light-emitting cell is not within the predefined angle from a gaze direction of the another eye; and when it is detected that the first viewing direction is within the predefined angle from the gaze direction of the given eye, and the second viewing direction is not within the predefined angle from the gaze direction of the another eye, controlling the corresponding portion of the active optical layer to modify the focal length of the given lenticular lens, to selectively increase a width of a corresponding region on the curved surface through which light from the given light-emitting cell passes toward the given eye.

This allows to further prioritize light-emitting cells that are aligned with the user's actual visual focus, while enabling more confident and perceptually relevant rendering decisions. This improves brightness and stability for content near the user's point of attention, while maintaining interocular separation and suppressing crosstalk. As a result, the displayed virtual content becomes sharper, more immersive, and more robust under natural gaze behaviour and head movement.

More additionally, optionally, the step of identifying the corresponding regions on the curved surface of the given lenticular lens comprises:

determining whether the given eye or the another eye is a dominant eye of the at least one user; and when it is detected that the first viewing direction is within the predefined angle from the gaze direction of the given eye, and the second viewing direction is within the predefined angle from the gaze direction of the another eye, controlling the corresponding portion of the active optical layer to modify the focal length of the given lenticular lens, to selectively increase a width of a corresponding region on the curved surface through which the light from the given light-emitting cell passes toward the dominant eye.

This approach ensures that visual content is prioritized for the eye with stronger perceptual influence, and enhances the stability, depth accuracy, and visual consistency of the displayed virtual content in ambiguous or overlapping gaze scenarios. Gaze-contingent focal length modification driven by eye dominance also improves perceptual targeting without compromising interocular separation, which contributes to a more comfortable and immersive 3D experience. Furthermore, the use of dominance-based selection supports robust rendering decisions in multi-user or variable lighting conditions, where momentary symmetry in gaze direction might otherwise cause artefacts or instability.

Furthermore, optionally, in the method, the thickness of the lenticular lens is within a predefined threshold relative to the focal length of the lenticular lens. Optionally, in the method, the focal length of the lenticular lens is greater than the thickness of the lenticular lens.

DETAILED DESCRIPTION OF THE DRAWINGS

Figure 1B:
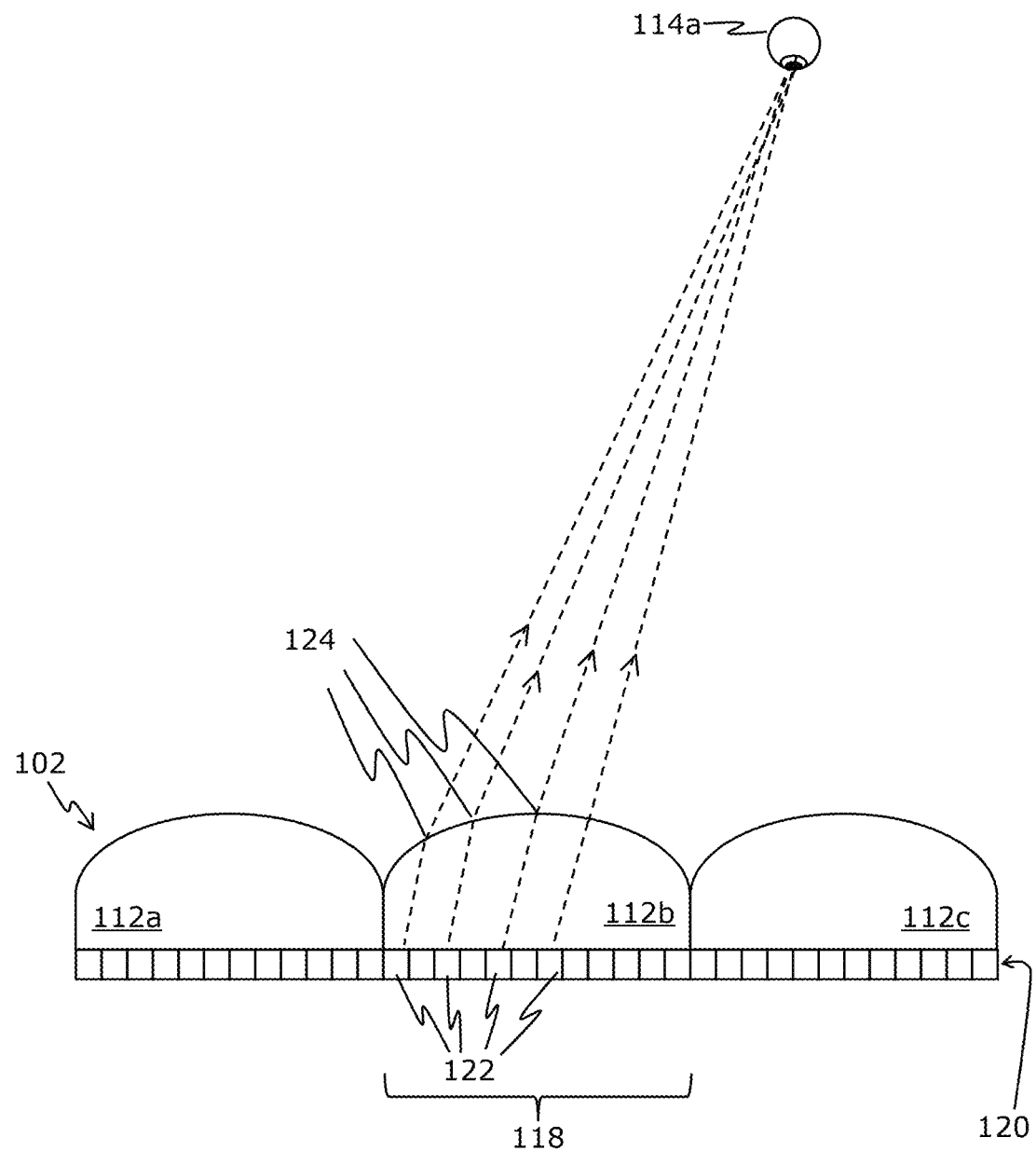
FIG. 1B depicts a zoomed-in part of a cross-section of the autostereoscopic display, in accordance with an embodiment of the present disclosure.

FIG. 1A is a schematic illustration of a system 100 that incorporates an autostereoscopic display 102 having improved lenticular resolution, while FIG. 1B depicts a zoomed-in part of a cross-section of the autostereoscopic display 102, in accordance with an embodiment of the present disclosure. Apart from the autostereoscopic display 102, the system 100 comprises an eye tracker 104 and at least one processor, depicted as a processor 106. The autostereoscopic display 102 comprises a light-emitting panel 108 comprising a plurality of light-emitting cells, and a lenticular array 110 arranged on an optical path of the light-emitting panel 108. The lenticular array 110 comprises a plurality of lenticular lenses, depicted as lenticular lenses 112a-112c in the zoomed-in part of the cross-section of the autostereoscopic display 102. The cross-section is cut along a Y-axis of autostereoscopic display 102, and shows respective widths of the lenticular lenses 112a-112c along the Y-axis. A focal length of a lenticular lens is different from a thickness of the lenticular lens along its optical axis.

The processor 106 is configured to:

determine a relative position of each eye 114a-114b of at least one user with respect to an image plane 116 of the autostereoscopic display 102, using the eye tracker 104;

generate or retrieve a given image to be presented to a given eye 114a of the at least one user, based on a relative position of the given eye 114a with respect to the image plane 116;

for an intersection 118 of a given row 120 of light-emitting cells and a given lenticular lens 112b, determine a given viewing direction from the given eye 114a toward said intersection 118, based on the relative position of the given eye 114a with respect to the image plane 116, a position of the given lenticular lens 112b in the lenticular array 110, and a position of the given row 120 in the light-emitting panel 108;

from a plurality of light-emitting cells that are arranged on the given row 120 and on whose optical path the given lenticular lens 112b lies, determine a given set of light-emitting cells 122 whose light travels toward the given eye 114a, based on the given viewing direction, a focal length of the given lenticular lens 112b, and a thickness of the given lenticular lens 112b along its optical axis;

identify corresponding regions 124 on a curved surface of the given lenticular lens 112b through which light from individual light-emitting cells 122 of the given set pass toward the given eye 114a;

map the corresponding regions 124 on the curved surface of the given lenticular lens 112b to respective pixel locations in the given image, based on locations of the corresponding regions 124 on the curved surface of the given lenticular lens 112b;

retrieve pixel values of pixels that are located at the respective pixel locations in the given image; and generate an output image for display by using the pixel values for the individual light-emitting cells 122 of the given set.

Figure 1C:
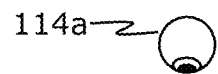
FIG. 1C depicts a schematic illustration of the system, in accordance with a specific embodiment of the present disclosure.
Figure 1C:
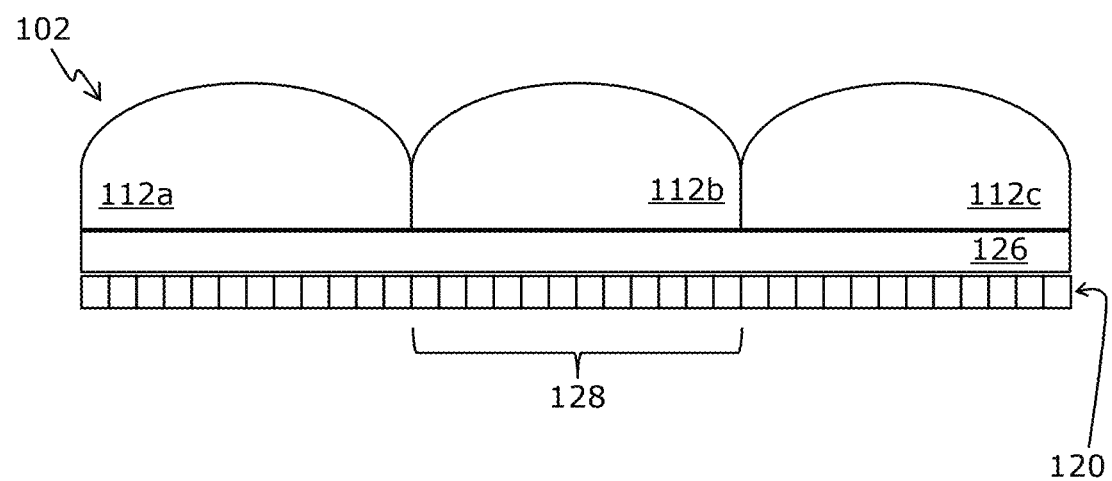

FIG. 1C depicts a schematic illustration of the system 100, in accordance with a specific embodiment of the present disclosure. Optionally, the lenticular array 110 further comprises an active optical layer 126 arranged between the light-emitting panel 108 and the plurality of lenticular lenses. The corresponding regions 124 on the curved surface of the given lenticular lens 112b through which the light from the individual light-emitting cells 122 of the given set pass toward the given eye 114a are identified, based on a focal length and a refractive index of the given lenticular lens 112b. Optionally, the processor 106 is configured to control a corresponding portion 128 of the active optical layer 126 to modify the focal length of the given lenticular lens 112b, to increase widths of the corresponding regions 124 on the curved surface through which the light from the individual light-emitting cells 122 of the given set pass toward the given eye 114a.

Figure 1D:
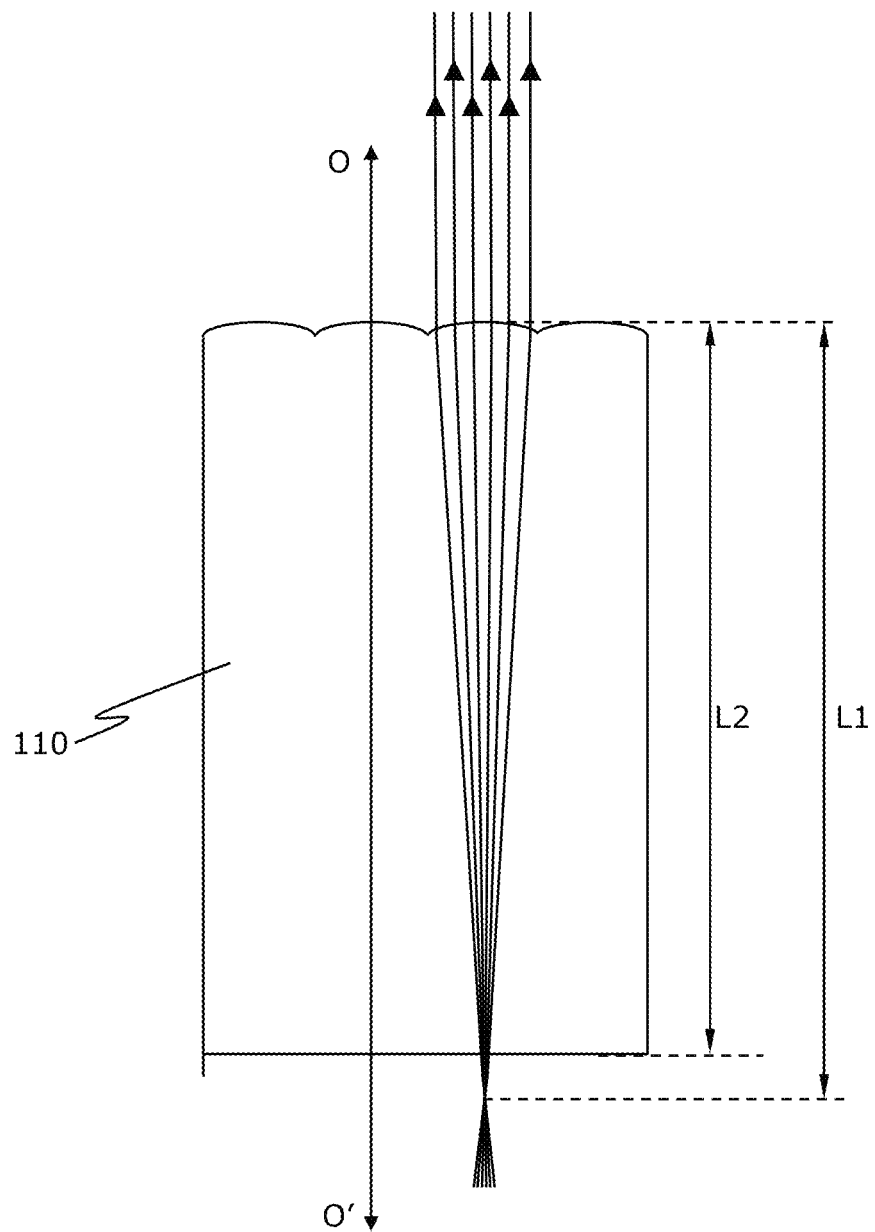
FIGS. 1D and 1E depict an example implementation in which a focal length of a lenticular lens in a lenticular array is different from a thickness of the lenticular lens along its optical axis, in accordance with an embodiment of the present disclosure.
Figure 1E:
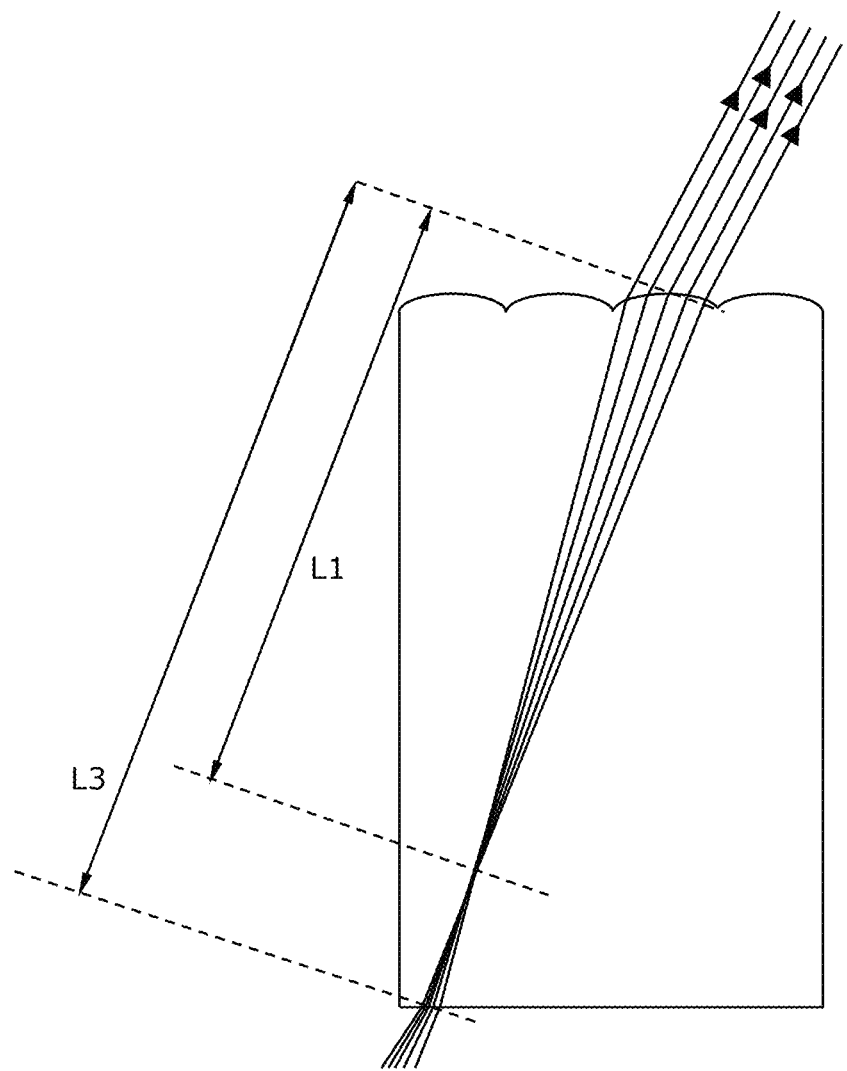

FIGS. 1D and 1E depict an example implementation in which a focal length L1 of a lenticular lens in the lenticular array 110 is different from a thickness L2 of the lenticular lens along its optical axis OO'. In the example implementation, the focal length L1 is shown to be greater than the thickness L2.

With reference to FIG. 1D, when a viewing direction of the given eye 114a is along the optical axis OO', the corresponding regions 124 on the curved surface of the given lenticular lens 112b through which the light from the individual light-emitting cells 122 of the given set pass toward the given eye 114a lie on the same side as the individual light-emitting cells 122.

With reference to FIG. 1E, when the viewing direction of the given eye 114a is oblique relative to the optical axis OO', an effective thickness L3 of the lenticular lens becomes greater than the focal length L1. As a result, the corresponding regions 124 on the curved surface of the given lenticular lens 112b through which the light from the individual light-emitting cells 122 of the given set pass toward the given eye 114a lie on an opposite side of the individual light-emitting cells 122. For example, light from a light-emitting cell located near a left edge of the given lenticular lens 112b may pass through a region near a right edge of the curved surface of the lenticular lens, and vice versa.

Figure 1F:
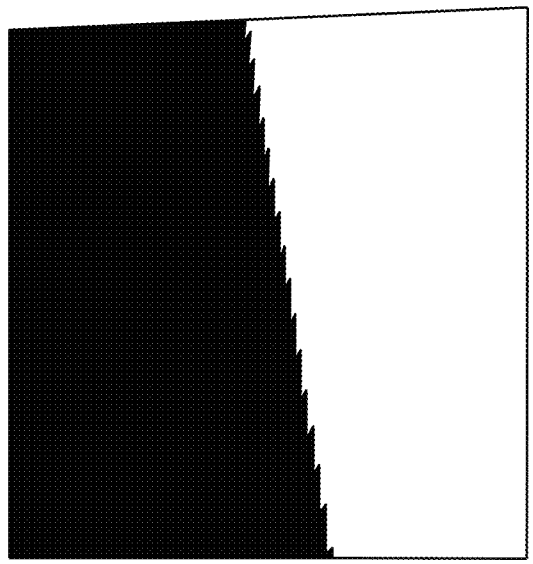
FIG. 1F depicts an inversion effect that occurs when an effective thickness of the lenticular lens becomes greater than the focal length, in accordance with an embodiment of the present disclosure.

For illustration purposes only, there will now be considered that the output image is such that a left half of the output image is white in colour and a right half of the output image is black in colour. In such a case, a lenticular lens of the lenticular 110 lying at a boundary of the left half and the right half of the output image during display would show an inversion effect, where the white colour would appear on the right side, while the black colour would appear on the left side. This is depicted in FIG. 1F. Notably, the lenticular lens has been tilted to show the inversion effect more clearly.

Figure 1G:
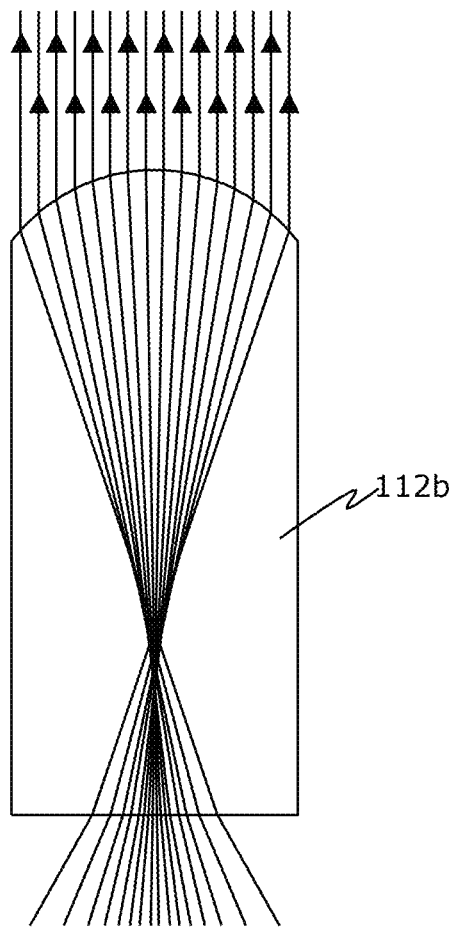
FIG. 1G depicts a non-uniform distribution of light emitted from light-emitting cells, due to optical aberrations.

FIG. 1G depicts that light emitted from the individual light-emitting cells 122 of the given set may not be uniformly distributed across the curved surface of the given lenticular lens 112b, due to optical aberrations (such as spherical aberration) introduced by the curved surface of the given lenticular lens 112b. Accordingly, this non-uniform distribution may be taken into account when identifying the corresponding regions 124 on the curved surface, to ensure accurate rendering toward the given eye 114a.

It may be understood by a person skilled in the art that FIGS. 1A-1G include simplified example implementations of the system 100 and how it works, for sake of clarity, which should not unduly limit the scope of the claims herein. It is to be understood that the specific implementation of the system 100 is not to be construed as limiting it to specific numbers or types of eye trackers, autostereoscopic displays, processors, light-emitting panels and lenticular arrays. The person skilled in the art will recognize many variations, alternatives, and modifications of embodiments of the present disclosure.

Figure 2:
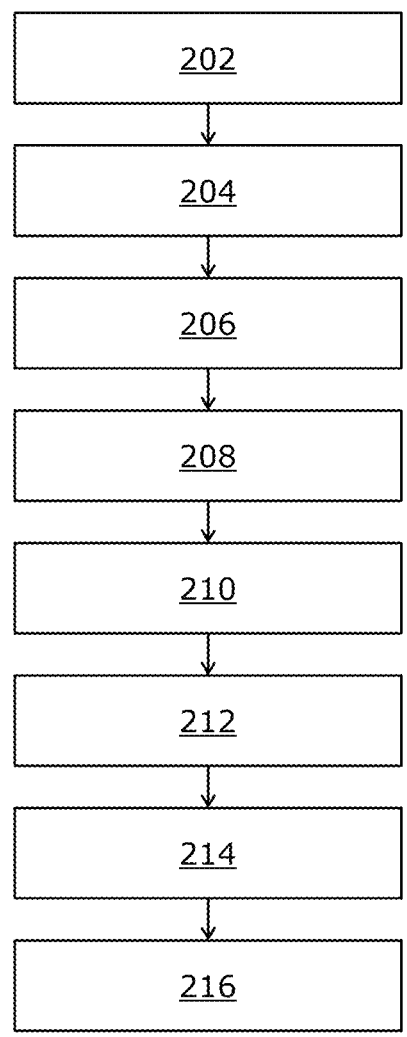
FIG. 2 depicts steps of a method for displaying via the system, in accordance with an embodiment of the present disclosure.

Referring to FIG. 2, illustrated are steps of a method for displaying via a system that incorporates an autostereoscopic display having improved lenticular resolution, in accordance with an embodiment of the present disclosure. At step 202, a relative position of each eye of at least one user with respect to an image plane of an autostereoscopic display is determined, using an eye tracker. The autostereoscopic display comprises a light-emitting panel and a lenticular array arranged on an optical path of the light-emitting panel, the light-emitting panel comprising a plurality of light-emitting cells, the lenticular array comprising a plurality of lenticular lenses, wherein a focal length of a lenticular lens is different from a thickness of the lenticular lens along its optical axis. At step 204, a given image to be presented to a given eye of the at least one user is generated or retrieved, based on a relative position of the given eye with respect to the image plane. At step 206, for an intersection of a given row of light-emitting cells and a given lenticular lens, a given viewing direction from the given eye toward said intersection is determined, based on the relative position of the given eye with respect to the image plane, a position of the given lenticular lens in the lenticular array, and a position of the given row in the light-emitting panel. At step 208, from a plurality of light-emitting cells that are arranged on the given row and on whose optical path the given lenticular lens lies, a given set of light-emitting cells whose light travels toward the given eye is determined, based on the given viewing direction, a focal length of the given lenticular lens, and a thickness of the given lenticular lens along its optical axis. At step 210, corresponding regions on a curved surface of the given lenticular lens through which light from individual light-emitting cells of the given set pass toward the given eye are identified. At step 212, the corresponding regions on the curved surface of the given lenticular lens are mapped to respective pixel locations in the given image, based on locations of the corresponding regions on the curved surface of the given lenticular lens. At step 214, pixel values of pixels that are located at the respective pixel locations in the given image are retrieved. At step 216, an output image for display is generated by using the pixel values for the individual light-emitting cells of the given set.

The aforementioned steps are only illustrative and other alternatives can also be provided where one or more steps are added, without departing from the scope of the claims herein.

The invention claimed is:
1. A system comprising:
an eye tracker;
an autostereoscopic display comprising:
a light-emitting panel comprising a plurality of light-emitting cells; and
a lenticular array arranged on an optical path of the light-emitting panel, the lenticular array comprising a plurality of lenticular lenses, wherein a focal length of a lenticular lens is different from a thickness of the lenticular lens along its optical axis; and
at least one processor configured to:
determine a relative position of each eye of at least one user with respect to an image plane of the autostereoscopic display, using the eye tracker;
generate or retrieve a given image to be presented to a given eye of the at least one user, based on a relative position of the given eye with respect to the image plane;
for an intersection of a given row of light-emitting cells and a given lenticular lens, determine a given viewing direction from the given eye toward said intersection, based on the relative position of the given eye with respect to the image plane, a position of the given lenticular lens in the lenticular array, and a position of the given row in the light-emitting panel;

from a plurality of light-emitting cells that are arranged on the given row and on whose optical path the given lenticular lens lies, determine a given set of light-emitting cells whose light travels toward the given eye, based on the given viewing direction, a focal length of the given lenticular lens, and a thickness of the given lenticular lens along its optical axis;

identify corresponding regions on a curved surface of the given lenticular lens through which light from individual light-emitting cells of the given set pass toward the given eye;

map the corresponding regions on the curved surface of the given lenticular lens to respective pixel locations in the given image, based on locations of the corresponding regions on the curved surface of the given lenticular lens;

retrieve pixel values of pixels that are located at the respective pixel locations in the given image;

generate an output image for display by using the pixel values for the individual light-emitting cells of the given set;

generate or retrieve another image to be presented to another eye of the at least one user, based on a relative position of the another eye with respect to the image plane;

for the intersection of the given row and the given lenticular lens, determine another viewing direction from the another eye toward the intersection, based on the relative position of the another eye with respect to the image plane, the position of the given lenticular lens in the lenticular array, and the position of the given row in the light-emitting panel;

from the plurality of light-emitting cells that are arranged on the given row and on whose optical path the given lenticular lens lies, determine another set of light-emitting cells whose light travels toward the another eye, based on the another viewing direction, the focal length of the given lenticular lens, and the thickness of the given lenticular lens;

identify other corresponding regions on the curved surface of the given lenticular lens through which light from individual light-emitting cells of the another set pass toward the another eye;

map the other corresponding regions on the curved surface of the given lenticular lens to other respective pixel locations in the another image, based on locations of the other corresponding regions on the curved surface of the given lenticular lens;

retrieve other pixel values of pixels that are located at the other respective pixel locations in the another image; and when generating the output image, use the other pixel values for the individual light-emitting cells of the another set.

2. The system of claim 1, wherein the thickness of the lenticular lens is within a predefined threshold relative to the focal length of the lenticular lens.

3. The system of claim 1, wherein the focal length of the lenticular lens is greater than the thickness of the lenticular lens.

4. The system of claim 1, wherein when identifying the corresponding regions on the curved surface of the given lenticular lens, the at least one processor is configured to:

determine respective widths of the corresponding regions along a width of the given lenticular lens;

for a given light-emitting cell of the given set, detect when a width of a first region on the curved surface through which light from the given light-emitting cell passes toward the given eye exceeds a first predefined threshold, and when a width of a second region on the curved surface through which light from the given light-emitting cell passes toward another eye of the at least one user is below a second predefined threshold; and when it is detected that the width of the first region exceeds the first predefined threshold, and the width of the second region is below the second predefined threshold, select the given light-emitting cell for retrieving a pixel value for display to the given eye.

5. The system of claim 4, wherein the at least one processor is configured to:

determine a shape and a density of a probability cloud for each eye of the at least one user, wherein a given probability cloud represents a probability distribution of the given eye being at a position within the given probability cloud, and another probability cloud represents a probability distribution of the another eye being at a position within the another probability cloud; and adjust at least one of: the first predefined threshold, the second predefined threshold, based on the shape and the density of the probability cloud for each eye.

6. The system of claim 1, wherein the at least one processor is configured to:

determine a gaze direction of each eye of the at least one user, using the eye tracker; and when determining the given set of light-emitting cells:
for a given light-emitting cell of the given set, detect when a first viewing direction from the given eye toward the given light-emitting cell is within a predefined angle from a gaze direction of the given eye, and when a second viewing direction from another eye of the at least one user toward the given light-emitting cell is not within the predefined angle from a gaze direction of the another eye;

when it is detected that the first viewing direction is within the predefined angle from the gaze direction of the given eye, and the second viewing direction is not within the predefined angle from the gaze direction of the another eye, select the given light-emitting cell for retrieving a pixel value for display to the given eye.

7. The system of claim 6, wherein when determining the given set of light-emitting cells, the at least one processor is configured to:

determine whether the given eye or the another eye is a dominant eye of the at least one user; and when it is detected that the first viewing direction is within the predefined angle from the gaze direction of the given eye, and the second viewing direction is within the predefined angle from the gaze direction of the another eye, select the given light-emitting cell for retrieving a pixel value for display to the dominant eye.

8. The system of claim 1, wherein the lenticular array further comprises an active optical layer arranged between the light-emitting panel and the plurality of lenticular lenses, wherein the corresponding regions on the curved surface of the given lenticular lens through which the light from the individual light-emitting cells of the given set pass toward the given eye are identified, based on a focal length and a refractive index of the given lenticular lens, wherein the at least one processor is configured to control a corresponding portion of the active optical layer to modify the focal length of the given lenticular lens, to increase widths of the corresponding regions on the curved surface through which the light from the individual light-emitting cells of the given set pass toward the given eye.

9. The system of claim 8, wherein the at least one processor is configured to:
determine a gaze direction of each eye of the at least one user, using the eye tracker; and
when identifying the corresponding regions on the curved surface of the given lenticular lens:
for a given light-emitting cell of the given set, detect when a first viewing direction from the given eye toward the given light-emitting cell is within a predefined angle from a gaze direction of the given eye, and when a second viewing direction from another eye of the at least one user toward the given light-emitting cell is not within the predefined angle from a gaze direction of the another eye; and
when it is detected that the first viewing direction is within the predefined angle from the gaze direction of the given eye, and the second viewing direction is not within the predefined angle from the gaze direction of the another eye, control the corresponding portion of the active optical layer to modify the focal length of the given lenticular lens, to selectively increase a width of a corresponding region on the curved surface through which light from the given light-emitting cell passes toward the given eye.

10. The system of claim 9, wherein when identifying the corresponding regions on the curved surface of the given lenticular lens, the at least one processor is configured to:
determine whether the given eye or the another eye is a dominant eye of the at least one user; and
when it is detected that the first viewing direction is within the predefined angle from the gaze direction of the given eye, and the second viewing direction is within the predefined angle from the gaze direction of the another eye, control the corresponding portion of the active optical layer to modify the focal length of the given lenticular lens, to selectively increase a width of a corresponding region on the curved surface through which the light from the given light-emitting cell passes toward the dominant eye.

11. A method comprising:
determining a relative position of each eye of at least one user with respect to an image plane of an autostereoscopic display, using an eye tracker, wherein the autostereoscopic display comprises a light-emitting panel and a lenticular array arranged on an optical path of the light-emitting panel, the light-emitting panel comprising a plurality of light-emitting cells, the lenticular array comprising a plurality of lenticular lenses, wherein a focal length of a lenticular lens is different from a thickness of the lenticular lens along its optical axis;
generating or retrieving a given image to be presented to a given eye of the at least one user, based on a relative position of the given eye with respect to the image plane;
for an intersection of a given row of light-emitting cells and a given lenticular lens, determining a given viewing direction from the given eye toward said intersection, based on the relative position of the given eye with respect to the image plane, a position of the given lenticular lens in the lenticular array, and a position of the given row in the light-emitting panel;
from a plurality of light-emitting cells that are arranged on the given row and on whose optical path the given lenticular lens lies, determining a given set of light-emitting cells whose light travels toward the given eye, based on the given viewing direction, a focal length of the given lenticular lens, and a thickness of the given lenticular lens along its optical axis;
identifying corresponding regions on a curved surface of the given lenticular lens through which light from individual light-emitting cells of the given set pass toward the given eye;
mapping the corresponding regions on the curved surface of the given lenticular lens to respective pixel locations in the given image, based on locations of the corresponding regions on the curved surface of the given lenticular lens;
retrieving pixel values of pixels that are located at the respective pixel locations in the given image;
generating an output image for display by using the pixel values for the individual light-emitting cells of the given set;
generating or retrieving another image to be presented to another eye of the at least one user, based on a relative position of the another eye with respect to the image plane;
for the intersection of the given row and the given lenticular lens, determining another viewing direction from the another eye toward the intersection, based on the relative position of the another eye with respect to the image plane, the position of the given lenticular lens in the lenticular array, and the position of the given row in the light-emitting panel;
from the plurality of light-emitting cells that are arranged on the given row and on whose optical path the given lenticular lens lies, determining another set of light-emitting cells whose light travels toward the another eye, based on the another viewing direction, the focal length of the given lenticular lens, and the thickness of the given lenticular lens;
identifying other corresponding regions on the curved surface of the given lenticular lens through which light from individual light-emitting cells of the another set pass toward the another eye;
mapping the other corresponding regions on the curved surface of the given lenticular lens to other respective pixel locations in the another image, based on locations of the other corresponding regions on the curved surface of the given lenticular lens;
retrieving other pixel values of pixels that are located at the other respective pixel locations in the another image; and
when generating the output image, using the other pixel values for the individual light-emitting cells of the another set.

12. The method of claim 11, wherein the step of identifying the corresponding regions on the curved surface of the given lenticular lens comprises:
determining respective widths of the corresponding regions along a width of the given lenticular lens;
for a given light-emitting cell of the given set, detecting when a width of a first region on the curved surface through which light from the given light-emitting cell passes toward the given eye exceeds a first predefined threshold, and when a width of a second region on the curved surface through which light from the given light-emitting cell passes toward another eye of the at least one user is below a second predefined threshold; and when it is detected that the width of the first region exceeds the first predefined threshold, and the width of the second region is below the second predefined threshold, selecting the given light-emitting cell for retrieving a pixel value for display to the given eye.

13. The method of claim 11, further comprising:

determining a gaze direction of each eye of the at least one user, using the eye tracker; and when determining the given set of light-emitting cells:

for a given light-emitting cell of the given set, detecting when a first viewing direction from the given eye toward the given light-emitting cell is within a predefined angle from a gaze direction of the given eye, and when a second viewing direction from another eye of the at least one user toward the given light-emitting cell is not within the predefined angle from a gaze direction of the another eye;

when it is detected that the first viewing direction is within the predefined angle from the gaze direction of the given eye, and the second viewing direction is not within the predefined angle from the gaze direction of the another eye, selecting the given light-emitting cell for retrieving a pixel value for display to the given eye.

14. The method of claim 13, wherein the step of determining the given set of light-emitting cells comprises:

determining whether the given eye or the another eye is a dominant eye of the at least one user; and when it is detected that the first viewing direction is within the predefined angle from the gaze direction of the given eye, and the second viewing direction is within the predefined angle from the gaze direction of the another eye, selecting the given light-emitting cell for retrieving a pixel value for display to the dominant eye.

15. The method of claim 11, wherein the lenticular array further comprises an active optical layer arranged between the light-emitting panel and the plurality of lenticular lenses, wherein the corresponding regions on the curved surface of the given lenticular lens through which the light from the individual light-emitting cells of the given set pass toward the given eye are identified, based on a focal length and a refractive index of the given lenticular lens, wherein the method further comprises controlling a corresponding portion of the active optical layer to modify the focal length of the given lenticular lens, to increase widths of the corresponding regions on the curved surface through which the light from the individual light-emitting cells of the given set pass toward the given eye.

16. The method of claim 15, further comprising:

determining a gaze direction of each eye of the at least one user, using the eye tracker; and when identifying the corresponding regions on the curved surface of the given lenticular lens:

for a given light-emitting cell of the given set, detecting when a first viewing direction from the given eye toward the given light-emitting cell is within a predefined angle from a gaze direction of the given eye, and when a second viewing direction from another eye of the at least one user toward the given light-emitting cell is not within the predefined angle from a gaze direction of the another eye; and when it is detected that the first viewing direction is within the predefined angle from the gaze direction of the given eye, and the second viewing direction is not within the predefined angle from the gaze direction of the another eye, controlling the corresponding portion of the active optical layer to modify the focal length of the given lenticular lens, to selectively increase a width of a corresponding region on the curved surface through which light from the given light-emitting cell passes toward the given eye.

17. The method of claim 16, wherein the step of identifying the corresponding regions on the curved surface of the given lenticular lens comprises:

determining whether the given eye or the another eye is a dominant eye of the at least one user; and when it is detected that the first viewing direction is within the predefined angle from the gaze direction of the given eye, and the second viewing direction is within the predefined angle from the gaze direction of the another eye, controlling the corresponding portion of the active optical layer to modify the focal length of the given lenticular lens, to selectively increase a width of a corresponding region on the curved surface through which the light from the given light-emitting cell passes toward the dominant eye.

* * * * *